United States Patent
Hamaguchi (10) Patent No.: US 7,509,314 B2
(45) Date of Patent: Mar. 24, 2009

(54) DOCUMENT RETRIEVAL SYSTEM RECOGNIZING TYPES AND VALUES OF NUMERIC SEARCH CONDITIONS

(75) Inventor: Yoshitaka Hamaguchi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 342 days.

(21) Appl. No.: 11/071,111

(22) Filed: Mar. 4, 2005

(65) Prior Publication Data

US 2005/0198027 A1 Sep. 8, 2005

(30) Foreign Application Priority Data

Mar. 5, 2004 (JP) ............... 2004-062462

(51) Int. Cl.
*G06F 17/30* (2006.01)
(52) U.S. Cl. ............... 707/5; 707/3
(58) Field of Classification Search ............ None
See application file for complete search history.

(56) References Cited

U.S. PATENT DOCUMENTS

| | | | |
|---|---|---|---|
| 5,321,833 A * | 6/1994 | Chang et al. ............... 707/5 |
| 5,710,915 A * | 1/1998 | McElhiney ............... 707/3 |
| 6,026,388 A * | 2/2000 | Liddy et al. ............... 707/1 |
| 6,026,398 A * | 2/2000 | Brown et al. ............... 707/5 |
| 6,070,158 A * | 5/2000 | Kirsch et al. ............... 707/3 |
| 6,519,592 B1 * | 2/2003 | Getchius et al. ............... 707/6 |
| 6,714,950 B1 * | 3/2004 | Ferguson ............... 707/201 |
| 6,741,985 B2 * | 5/2004 | Green ............... 707/5 |
| 6,938,053 B2 * | 8/2005 | Jaro ............... 707/104.1 |
| 2003/0065660 A1 * | 4/2003 | Lau et al. ............... 707/5 |
| 2003/0084040 A1 * | 5/2003 | Jeffrey ............... 707/3 |

FOREIGN PATENT DOCUMENTS

JP 2000-322416 11/2000

* cited by examiner

*Primary Examiner*—Tim T Vo
*Assistant Examiner*—Michelle Owyang
(74) *Attorney, Agent, or Firm*—Venable LLP; Michael A. Sartori; Catherine M. Voorhees (57) ABSTRACT

A document retrieval system has an index information generator that generates index information about the frequency of occurrence of non-numeric terms in documents, and index information about the numeric values of numeric terms and the types of quantities they represent. Numeric terms received as search conditions are processed by a numeric information generator that generates search information indicating the type and numeric value of each numeric term. The index information generator and numeric information generator preferably convert numeric values to a standard notation. Numeric search conditions can then be used appropriately, flexibly, and conveniently to obtain useful retrieval results.

16 Claims, 5 Drawing Sheets

AA MOTORS HAS BROUGHT OUT A NEW ORYX FOUR-WHEEL-DRIVE VEHICLE, AVAILABLE IN 1800cc, 2000cc, AND 2200cc MODELS, PRICED FROM 1,980,000 YEN.

BB MACHINERY HAS BROUGHT OUT A NEW DOVER FOUR-WHEEL-DRIVE VEHICLE WITH A SUNROOF OPTION, PRICED FROM 2,000,000 YEN

FIG.3

| CHARACTER STRING | DOCUMENT ID | TERM FREQUENCY OR NUMERIC VALUE | |
|---|---|---|---|
| AA MOTORS | 1 | 1 | (L1) |
| 4-WHEEL-DRIVE VEHICLE | 1 | 1 | (L2) |
| ORYX | 2 | 1 | (L3) |
| MODEL | 1 | 1 | (L4) |
| PRICE | 1 | 1 | (L5) |
| | 1 | 1 | (L6) |
| <capacity> | 1 | 1800 | (L7) |
| | 1 | 2000 | (L8) |
| | 1 | 2200 | (L9) |
| <price> | 1 | 1980000 | (L10) |
| | 2 | 2000000 | (L11) |
| BB MACHINERY | 1 | 1 | (L12) |
| OPTION | 2 | 1 | (L13) |
| SUNROOF | 2 | 1 | (L14) |
| DOVER | 2 | 1 | (L15) |

| CHARACTER STRING | DOCUMENT ID | TERM FREQUENCY OR NUMERIC VALUE | |
|---|---|---|---|
| AA MOTORS | 1 | 1 | (L21) |
| 4-WHEEL-DRIVE VEHICLE | 1 | 1 | (L22) |
| ORYX | 2 | 1 | (L23) |
| MODEL | 1 | 1 | (L24) |
| PRICE | 1 | 1 | (L25) |
| <capacity-max> | 1 | 2200 | (L26) |
| <capacity-min> | 1 | 1800 | (L27) |
| <price-max> | 1 | 1980000 | (L28) |
| <price-max> | 2 | 2000000 | (L29) |
| <price-min> | 1 | 1980000 | (L30) |
| <price-min> | 2 | 2000000 | (L31) |
| BB MACHINERY | 1 | 1 | (L32) |
| OPTION | 2 | 1 | (L33) |
| SUNROOF | 2 | 1 | (L34) |
| DOVER | 2 | 1 | (L35) |
|  |  |  | (L36) |

DOCUMENT RETRIEVAL SYSTEM RECOGNIZING TYPES AND VALUES OF NUMERIC SEARCH CONDITIONS

BACKGROUND OF THE INVENTION

1. Field of the Invention

The present invention relates to a document retrieval system, a search condition input apparatus, a retrieval execution apparatus, a document retrieval method, and a document retrieval program suitable for the retrieval of a document from a set of documents when the search conditions submitted by the user include numeric expressions.

2. Description of the Related Art

Japanese Unexamined Patent Application Publication No. 2000-322416 describes a technique for retrieving a document from a set of documents by using an index that lists terms appearing in the set of documents, the number of documents in which each term appears (its document frequency DF), and the frequency with which the term appears in each document (its term frequency TF). When a user specifies a term as a search condition, its associated DF and TF values are obtainable from the index information, so they do not have to be calculated and the retrieval time is shortened accordingly. The retrieved documents can also be scored by a mathematical formula using the DF and TF values, and when the retrieval result is presented to the user, the document identifiers can be presented in descending score order.

Since the DF value of a term changes over time as documents are added, deleted, or modified, the index information includes, for each term, a plurality of DF values and the dates on which they were calculated. If the user specifies a range of dates as a search condition, in order to restrict the search to documents added or updated within the specified date range, the documents are scored on the basis of DF values in the specified range of dates.

Since the scoring formula weights the TF values according to the DF values, a specified date range alters all of the scores calculated for the documents. The user in general does not realize this, and may think that the date range has no more significance than a keyword term search condition. The retrieval result may therefore turn out to be rather different from what the user expects.

There are also cases in which the user would like to specify dates appearing as character strings in the documents as search conditions, instead of specifying a range of dates on which documents were added or modified. This is not provided for in the prior art cited above.

Depending on the rules by which the retrieval engine operates, the user may be able to specify a date as a retrieval condition in the same way as an ordinary word or phrase is specified, but because of the different ways in which dates are presented in text, this type of retrieval condition does not always yield the desired result: for example, a search conducted with 'May 1' as a search condition may fail to find documents including such expressions as '5/1' or '1st of May'.

In dealing with dates, accordingly, current document retrieval techniques lack flexibility and convenience, and tend to produce retrieval results of poor quality and low utility. The same is true for other numeric search conditions, such as numeric expressions of length, price, and the like.

There is a need for a retrieval apparatus that can treat dates and other numeric expressions on the same basis as search conditions not including numeric expressions, and can deal with differences in numeric notation.

SUMMARY OF THE INVENTION

An object of the present invention is to provide a retrieval apparatus that can make appropriate and flexible use of numeric search conditions.

The invented document retrieval system retrieves documents from a set of documents according to one or more terms received as search conditions. The terms may include both numeric terms, which include numeric values, and non-numeric terms, which do not include numeric values.

A first processor generates numeric term index information and non-numeric term index information for the documents. The non-numeric term index information includes information about the frequency of occurrence of non-numeric terms in the documents. The numeric term index information includes information about the types and numeric values of numeric terms appearing in the documents. The type of a numeric term indicates, for example, the type of quantity represented by the numeric value of the term.

A second processor examines each numeric term received as a search condition, determines its type, and generates numeric search information indicating the type and numeric value of the numeric term.

The first processor and the second processor may also convert numeric terms to a standard notation.

The invention enables a set of documents to be searched to find documents including numeric terms of the same type as a numeric term received as a search condition, despite differences in numeric notation, and the documents can be scored on the basis of, for example, how closely the numeric values of those numeric terms match the numeric value of the numeric term input as the search condition. Searches can also be based on ranges of numeric values, and date range searches can be made without having undesired effects on non-numeric search conditions.

Another embodiment of the invention is a machine-readable medium storing a program for retrieving a document from a set of documents according to one or more terms received as search conditions. The search terms that can be received include both numeric terms, which include numeric values, and non-numeric terms, which do not include numeric values, and the program is executable by a computing device, the program including: instructions for generating at least one item of index information for each document in the set of documents, the index information generated for the documents including both numeric term index information and non-numeric term index information, the non-numeric term index information including information about frequency of occurrence of non-numeric terms in the document, the numeric term index information including information about types and numeric values of numeric terms appearing in the document; and instructions for examining each numeric term received as a search condition, determining its type, and generating numeric search information indicating the type and numeric value of the numeric term.

DETAILED DESCRIPTION OF THE INVENTION

Embodiments of the invention will now be described with reference to the attached drawings, in which like elements are indicated by like reference characters.

Figure 1:
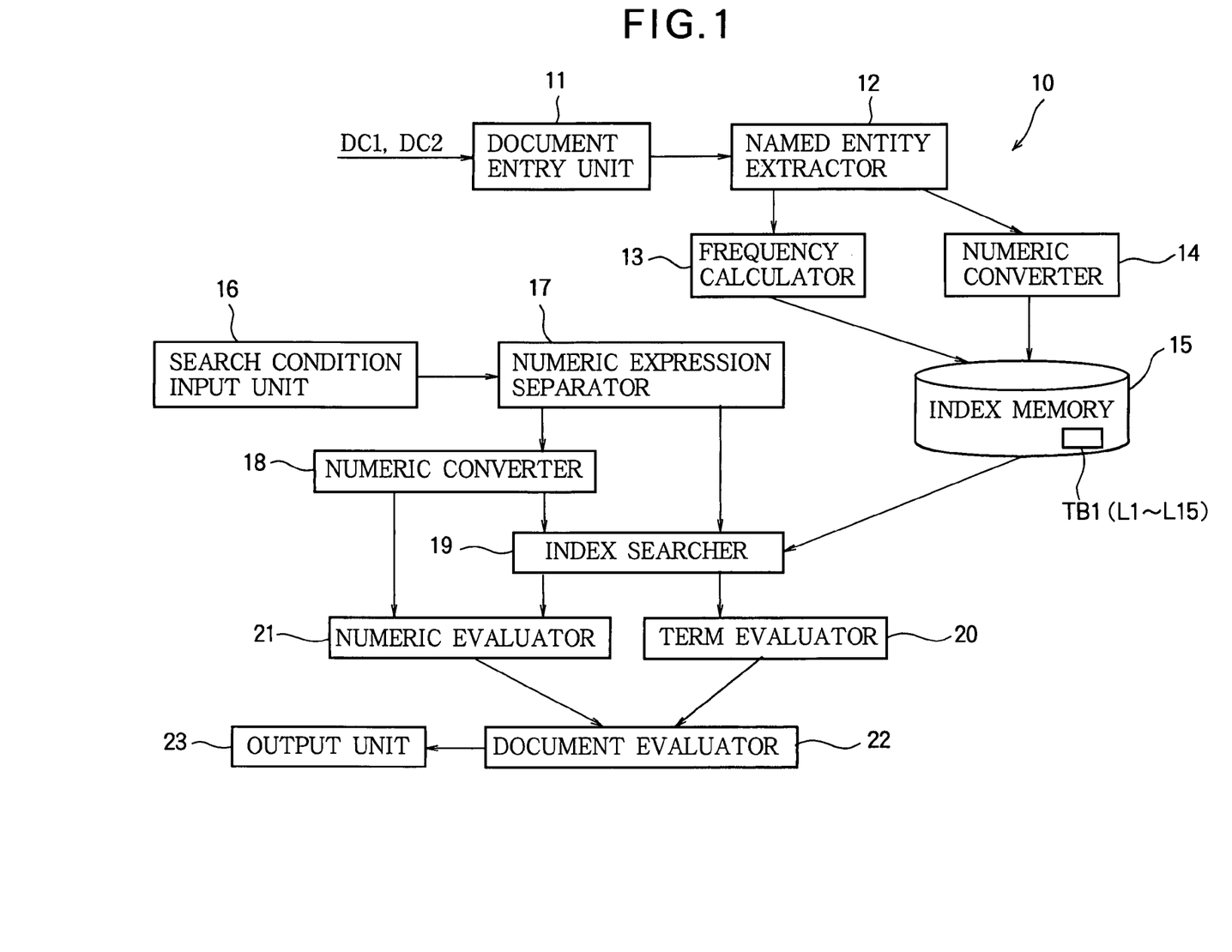
FIG. 1 is a block diagram of a document retrieval apparatus according to a first embodiment of the invention.

Referring to FIG. 1, the first embodiment is a document retrieval apparatus 10 comprising a document entry unit 11, a named entity extractor 12, a frequency calculator 13, a numeric converter 14, an index memory 15, a search condition input unit 16, a numeric expression separator 17, a numeric converter 18, an index searcher 19, a term evaluator 20, a numeric evaluator 21, a document evaluator 22, and an output unit 23.

The document entry unit 11 receives the content of documents available for retrieval. In the drawing, the document entry unit 11 receives the content of two documents DC1 and DC2, shown in FIGS. 2A and 2B, which form the set of documents available for retrieval. In practice, the set of documents may of course be much larger than two documents.

From the received document contents, the named entity extractor 12 extracts expressions that can form the basis for retrieval of the documents. These expressions, referred to as named entities or named character strings, are character strings that function to indicate features of the documents. Although various types of words and phrases can operate as named character strings, in the present embodiment, as an example, named character strings will be selected from among the nouns and noun phrases appearing in the documents. The named entity extractor 12 uses natural language processing techniques to eliminate nouns and noun phrases that are too general in meaning and selects only nouns and noun phrases with strong characterizing functions.

Named character strings can be classified as numeric or non-numeric, depending on whether or not they contain numeric values. The named entity extractor 12 may attach attribute information to each named entity that it extracts, indicating whether the named entity is a numeric named character string or a non-numeric named character string, and use the attribute information to distinguish between numeric named character strings and non-numeric named character strings.

The process of extracting numeric named character strings can be carried out by, for example, using general morphological analysis to extract words and examining each word to determine whether or not it expresses a numeric unit. If a word expresses a numeric unit, the word and the preceding numeric character string are extracted together as a numeric named character string. This method extracts numeric named character strings of the '(digit string)+ unit' form. Numeric named character strings that do not include units can also be extracted by natural language processing.

The named entity extractor 12 supplies the non-numeric named character strings it extracts from the documents to the frequency calculator 13, and supplies the numeric named character strings to the numeric converter 14.

The frequency calculator 13 calculates the frequency (term frequency TF) with which a supplied non-numeric named character string appears in the document from which it was extracted (document DC1, for example), and stores the calculated term frequency (TF) value in the index information associated with the document in the index memory 15. Index information including a non-numeric named character string (an ordinary word) and its associated term frequency TF value is referred to as non-numeric index information.

The numeric converter 14 has two functions: it absorbs differences in numeric notation in the supplied numeric named character strings by converting numeric named character strings to a predetermined standard numeric notation, and it classifies the numeric values into numeric types. Since the range of differences in numeric notation using numeric expressions is wider than the range of different ways in which ordinary words can be written, numeric named character strings have to be converted to a standard notation in order to yield a high-quality retrieval results efficiently.

For example, the numeric expression '1 kg', can be represented as '1000 g', '1 kilogram', or 'one thousand grams', and by various other character strings.

Although any numeric notation can be selected as the standard numeric notation, the efficiency of the retrieval process can be improved if a numeric notation that is generally used and appears with high frequency is selected, because when this notation appears, the conversion process carried out by the numeric converter 14 can be omitted.

In the conversion process, the numeric value itself often has to be converted to fit to the numeric unit used in a converted numeric named character string, depending on the relationship between the numeric notation used in the numeric named character string before conversion and the standard numeric notation. If, for example, the numeric named character string '1 kg' is converted to the numeric named character string '1000 g', the numeric value '1' has to be converted to the numeric value '1000'.

Numeric types indicate the type of information the numeric value represents, such as length, weight, date, time, and so on. Character strings naming the various numeric types are prestored in the document retrieval apparatus 10. Examples of such prestored numeric type character strings include 'weight', 'capacity', 'price', and so on.

Various methods can be used to enable the numeric converter 14 to identify the numeric type of a numeric named character string. If a numeric named character string includes a numeric unit ('kg', for example), the numeric converter 14 will generally be able to determine the numeric type ('weight', for example) from the numeric unit. If a numeric named character string does not include a numeric unit, the numeric converter 14 can infer the numeric type of the numeric value by using natural language processing techniques.

The index memory 15 stores the numeric values and numeric type character strings of numeric named character strings obtained from a document (document DC1, for example) as numeric index information associated with the document. The index memory 15 stores index information associated with each document in the set of documents (documents DC1 and DC2 in the present example). Depending on the content of an individual document, the index information associated with the document may include only non-numeric index information or only numeric index information, but the index information generally includes both non-numeric index information and numeric index information.

Figure 3:
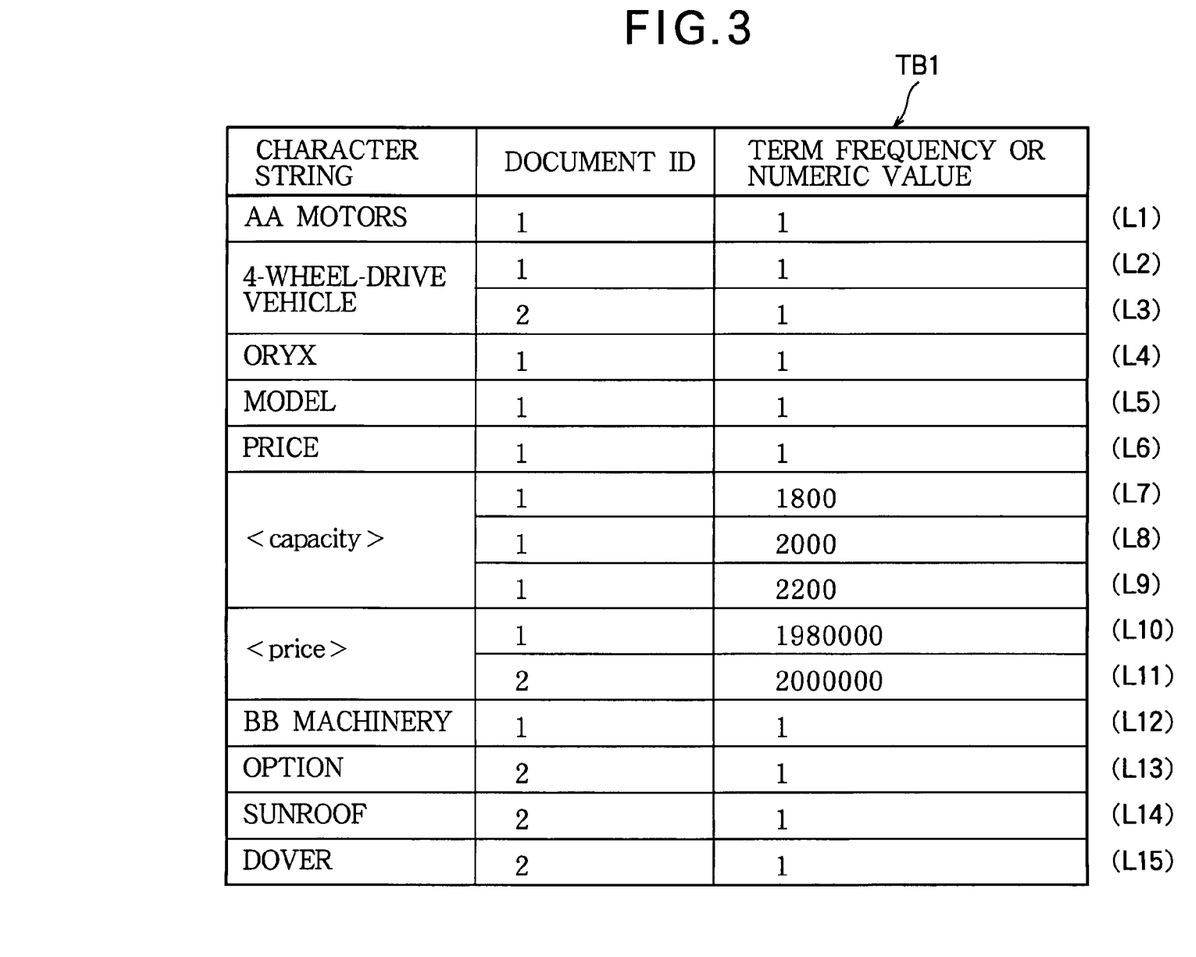
FIG. 3 shows an index table constructed from the exemplary documents in the first embodiment.

The document retrieval apparatus 10 assigns unique document identifiers to the individual documents in the set of documents. FIG. 3 shows an index table TB1 providing the index information associated with documents DC1 and DC2, using document identifiers 1 and 2 to identify documents DC1 and DC2, respectively.

The table TB1 in FIG. 3 is organized into a character string column, a document identifier column, and a term frequency or numeric value column.

Named character strings (both non-numeric named character strings and numeric named character strings) are listed in the character string column. Numeric character strings are listed by type.

The document identifiers of the documents from which the named character strings were extracted are listed in the document identifier column.

The term frequency or numeric value column gives the calculated term frequency TF of non-numeric named character strings and the numeric values included in numeric named character strings.

It would be natural to list the term frequency TF of non-numeric named character strings and the numeric values of numeric named character strings in separate columns, but since a non-numeric named character string has a TF value but no numeric value, and a numeric named character string has a numeric value but no TF value, it us possible to list both values in the same column. This scheme has the advantages of saving storage space and enabling the index table to have the same column structure as in conventional document retrieval apparatus using term frequency.

A numeric expression may sometimes be used as a proper noun or in some other non-numeric way, (as when '1951' is used as a film title, for example). In this case it would be preferable to have separate columns so that both the term frequency TF of the numeric expression and its numeric value could be indexed. While the invention may be practiced with separate term frequency and numeric value columns, in the present embodiment both items of information will be listed in the same column, as in FIG. 3.

Table TB1 in FIG. 3 includes fifteen rows L1-L15. The rows having document identifier 1 give index information for document DC1; the rows having document identifier 2 give index information for document DC2. Each row includes a character string, its document identifier, and its term frequency or numeric value: for example, row L2 includes the character string 'four-wheel drive vehicle', document identifier 1, and term frequency 1; row L3 includes the character string 'four-wheel drive vehicle' document identifier 2, and term frequency 1; and row L4 includes the character string 'Oryx', document identifier 1, and term frequency 1.

Rows L7-L11 are headed by numeric type character strings ('capacity' and 'price') and give numeric index information; rows L1-L6 and L12-L15 are headed by non-numeric named character strings ('four-wheel-drive vehicle', for example) and give non-numeric index information.

The numeric values in the fields designated T11-T19 in each row in FIG. 3 indicate the term frequency TF of a non-numeric named character string or the numeric value included in a numeric named character string.

A user U1 who wants to retrieve a document enters character strings as search conditions into the search condition input unit 16. The search conditions accepted by the search condition input unit 16 depend on the design of the user interface of the search condition input unit 16; the user U1 selects search conditions for input from within the accepted range of search conditions. In one example, the user interface displays one field on a screen for entry of numeric named character strings (input numeric character strings) and another field for entry of non-numeric named character strings (input non-numeric character strings), and admits the entry of any type of numeric character strings in the numeric entry field. A user U1 who enters both input numeric and non-numeric character strings as search conditions will become most thoroughly aware of the features of the first embodiment, so it will be assumed in the description below that both input numeric and non-numeric character strings are entered.

The numeric expression separator 17 is supplied with input numeric and non-numeric character strings from the search condition input unit 16, and determines whether each supplied input character string is a numeric character string or a non-numeric character string. The numeric expression separator 17 supplies input character strings that are determined to be numeric character strings to the numeric converter 18, and supplies input character strings that are determined to be non-numeric character strings to the index searcher 19.

Although the numeric expression separator 17 may have the same natural language processing functions as the named entity extractor 12, and use these functions to determine whether an input character string is a numeric character string or a non-numeric character string, a much simpler decision process may be adequate, depending on the configuration of the user interface.

If, for example, the user interface provides a first field for entry of numeric character strings and a second field for entry of non-numeric character strings, as described above, then whether an input character string is numeric or non-numeric can be determined from the field in which the character string is entered.

The numeric converter 18 has the same function as the numeric converter 14, so a detailed description will be omitted. The numeric converter 18 converts an input numeric character string to a numeric value in the standard numeric notation and obtains its numeric type character string. The numeric value in the standard numeric notation and the numeric type character string are supplied to the numeric evaluator 21; the numeric type character string is also supplied to the index searcher 19.

To search table TB1, the index searcher 19 uses an input non-numeric named character string ('four-wheel-drive vehicle', for example) supplied from the numeric expression separator 17 or a numeric type character string ('capacity', for example) as a search key and searches for matching index information. There may be multiple search keys. The search initially yields the term frequency TF of each non-numeric named character string and the numeric value or values associated with each numeric type character string; these initial results are then processed (evaluated) to select one or more documents or document identifiers to be presented to the user U1 as the final retrieval result. The single document that best fits the input search conditions may be selected, or a specified number of best-fitting documents may be selected. Alternatively, the document identifiers of all the documents found in the initial search process may be presented in an order depending on their goodness of fit with the input search conditions. Both the term frequency TF or numeric value and the document identifier should then be obtained in the initial search of table TB1.

The term evaluator 20 and numeric evaluator 21, or third processor and fourth processor, respectively, carry out the evaluation process mentioned above, and the document evaluator 22 obtains the final retrieval result from the result of the evaluation process.

From the term frequency TF obtained by using an input non-numeric character string as a search key, the term evaluator 20 calculates a non-numeric evaluation index indicating a goodness of fit between the non-numeric search condition and each document. The non-numeric evaluation index may be calculated by formula (1) below, in which $C_1$ and $C_2$ are constants.

$$C_1 \times TF/(C_2+TF) \qquad (1)$$

The constants $C_1$ and $C_2$ can be given various specific values, such as $C_1=1.5$ and $C_2=1$, for example.

Instead of formula (1), other methods of using term frequency to evaluate goodness of fit may be used as in conventional document retrieval systems.

The numeric evaluator 21 finds a numeric evaluation index that indicates goodness of fit between the numeric value included in an input numeric character string (a numeric condition) and the individual numeric values included in numeric named character strings having the same numeric type character string as the input numeric character string. Among documents including numeric entities with this numeric type character string, the document including the numeric value closest to the numeric value included in the input numeric character string is evaluated as best fitting the numeric condition.

To select the numeric value closest to the value in an input numeric character string, the ratio between the two values may be calculated and used as the numeric evaluation index, taking the reciprocal if the ratio is greater than unity, so that the highest ratio indicates the best fit. Other general numeric comparison methods may also be used.

If a document does not include any numeric named character string having the same numeric type character string as the input numeric character string, its goodness of fit is preferably set to the minimum value (zero, for example) in the numeric evaluation index scale.

For both numeric and non-numeric character strings entered as search keys, a higher evaluation index value indicates a better fit. If a plurality of non-numeric character strings are entered as search conditions, the evaluation index should be calculated so as to favor the documents including the most terms that appear with comparatively high frequency.

The document evaluator 22 or fifth processor combines the non-numeric evaluation index obtained by the term evaluator 20 and the numeric evaluation index obtained by the numeric evaluator 21 for each document (that is, each document identifier) to evaluate its overall goodness of fit. Various methods of combining the numeric and non-numeric evaluation indexes are possible; a convenient method is simply to take the sum of the numeric and non-numeric evaluation indexes as the combined evaluation result.

The output unit 23 presents the final retrieval result to the user U1. This can be done by various methods as noted above: for example, the document identifier (or the content) of one document or a specified number of documents that best fit the search condition may be presented as the final retrieval result; the document identifiers of documents for which the overall goodness of fit calculated by the document evaluator 22 exceeds a predetermined threshold value may be presented; or the document identifiers of all the documents (documents DC1 and DC2, in the present example) may be presented in order of their goodness of fit, with the document identifier of the document best fitting the search condition at the top of the list.

The constituent elements described above combine to operate as follows.

Before retrieving documents according to search conditions entered by the user U1, the document retrieval apparatus 10 generates table TB1 as described below.

When a document (document DC1, for example) is received from the document entry unit 11, the named entity extractor 12 extracts from the received document DC1 named character strings that indicate features of the document, supplies the numeric named character strings it extracts from the document to the numeric converter 14, and supplies the non-numeric named character strings to the frequency calculator 13. Non-numeric named character strings such as 'AA Motors', 'four-wheel-drive vehicle', 'Oryx', 'model', and 'price', and numeric named character strings such as '1800 cc', '2000 cc', '2200 cc', and '1,980,000 yen' are extracted from the content of document DC1 shown in FIG. 2A.

When the frequency calculator 13 processes the non-numeric named character string 'AA Motors', the frequency calculator 13 calculates the term frequency (1) with which the non-numeric named character string 'AA Motors' appears in document DC1, and generates the highest row L1 in table TB1 in FIG. 3. Row L1 then includes document identifier 1 for document DC1. Other non-numeric named character strings such as 'four-wheel-drive vehicle' are processed in the same way as the non-numeric named character string 'AA Motors': the frequency calculator 13 generates rows L2, L4-L6, and L12 in table TB1 one by one. The generation of non-numeric index information is thereby completed.

The order in which the non-numeric named character strings are processed may differ from the order described above.

When the numeric converter 14 processes the numeric named character string '1800 cc', since its numeric unit is 'cc', the numeric converter 14 can easily tell that the included numeric value should have the numeric type character string 'capacity'. Although the numeric converter 14 converts numeric named character strings to standard numeric notation as necessary, since the numeric named character string '1800 cc' is originally written in document DC1 in the standard numeric notation, this conversion can be omitted. From the numeric named character string '1800 cc', the numeric converter 14 generates row L7 in table TB1.

In the term frequency or numeric value column, row L7 does not include the term frequency (1) with which the numeric named character string '1800 cc' appears in document DC1 but instead includes the numeric value '1800', as described above. Like the rows (row L1, for example) that the frequency calculator 13 generates from the non-numeric character strings, row L7 includes the document identifier (1) of document DC1.

The numeric converter 14 processes the other numeric named character strings '2000 cc', '2200 cc', and '1,980,000 yen' in the same way as the numeric named character string '1800 cc' to generate rows L8-L10 in table TB1. The generation of numeric index information associated with document DC1 is thereby completed.

The order in which the numeric named character strings are processed may differ from the order described above.

Figure 2A:
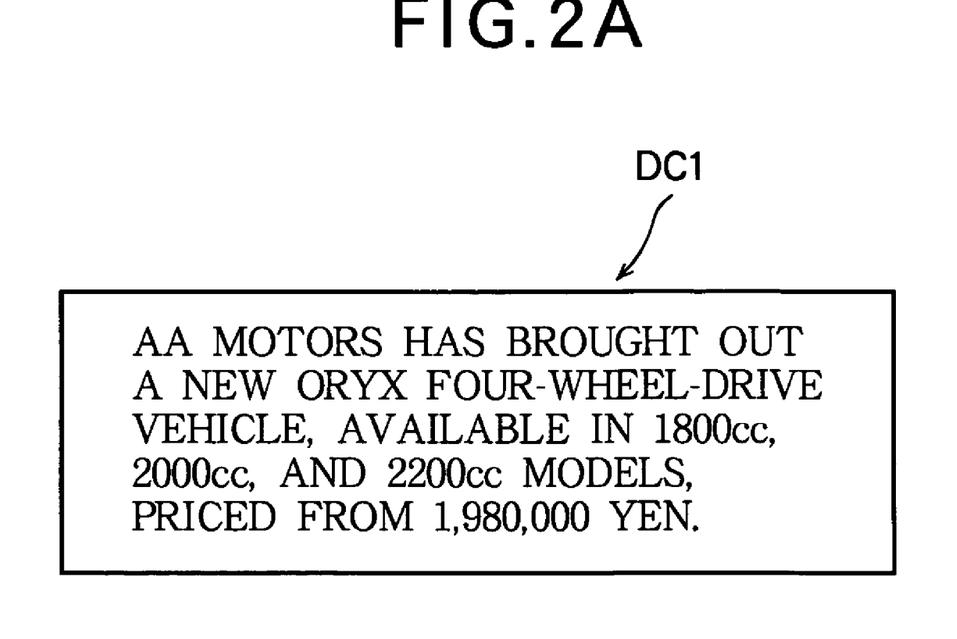
FIGS. 2A and 2B show exemplary documents.
Figure 2B:
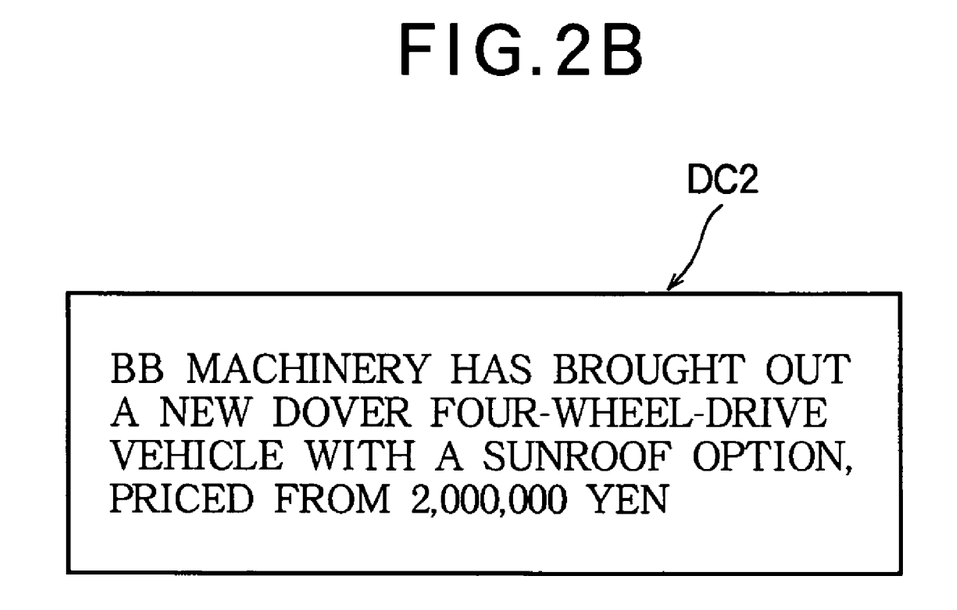

The frequency calculator 13 and the numeric converter 14 also process the non-numeric and numeric character strings extracted from document DC2 in FIG. 2B in the manner described above to generate rows L3, L11, and L13-L15 in table TB1.

With table TB1 in FIG. 3 thus completed, the document retrieval apparatus 10 is ready to retrieve documents according to search conditions entered by the user U1. The document retrieval operation will be described below. It will be assumed in the description below that the document identifiers of all the documents are presented as the final retrieval result. The document identifiers are presented to the user U1 in an order depending on the goodness of fit with the search conditions entered by the user U1.

The user U1 selects search conditions for input from within the range of search conditions accepted by the user interface provided by the search condition input unit 16. It will be assumed as an example in the description below that the character strings 'four-wheel-drive vehicle', 'sunroof', '2000 cc' and '2 million yen' are entered.

The numeric expression separator 17 determines whether each input character string is a numeric character string or a non-numeric character string, supplies input character strings that are determined to be numeric character strings to the numeric converter 18, and supplies input character strings that are determined to be non-numeric character strings to the index searcher 19.

Although numeric character strings can be identified by various methods as noted above, if the user U1 enters each input numeric character string with a numeric unit as in the present example, the numeric expression separator 17 will easily be able to identify numeric input character strings from the numeric unit, even if the user interface allows any form of text to be entered in the search condition field.

The numeric converter 18 operates in the same way as the numeric converter 14, identifying numeric type character strings for the character strings that are determined to be numeric character strings by the numeric expression separator 17, and supplies the numeric type character strings to the index searcher 19.

'Capacity' is identified as the numeric type character string of the input numeric character string '2000 cc'; 'price' is identified as the numeric type character string of the input numeric character string '2 million yen'. The input numeric character string '2 million yen' is converted to the standard notation '2000000 yen'.

When a numeric type character string is supplied to the index searcher 19, the index searcher 19 searches table TB1 by using the numeric type character string and the input numeric character string from which the numeric type character string was identified as search keys. The retrieval results, however, must be organized in association with the document identifiers.

In the present example there are just two documents. It will be assumed that document DC1 is evaluated first; then document DC2 is evaluated.

When the index searcher 19 searches table TB1 by using the numeric type character string 'capacity' as the search key, the document identifier (1) of document DC1 and the numeric values '1800', '2000', and '2200' in rows L7-L9 are obtained. Among the numeric values in rows L7-L9, the numeric value '2000' in row L8 is closest to the value of the input numeric character string '2000 cc'. Since the numeric value '2000' in row L8 matches the value '2000' of the input numeric character string '2000 cc' in the present example, the calculated ratio between the two values is unity (2000/2000=1). This value (1) is used in calculating the numeric evaluation index for document DC1.

When the index searcher 19 searches table TB1 by using the numeric type character string 'price' as the search key, the document identifiers (1) and (2) and numeric values '1980000' and '2000000' in rows L10 and L11 are obtained. Since row L11 does not include the document identifier (1) of document DC1, row L11 is omitted when the goodness of fit between document DC1 and the search condition is evaluated.

When the ratio between the numeric value '1980000' in row L10 and the numeric value '2000000' of the converted input numeric character string '2000000 yen' is calculated, the ratio 1980000/2000000=0.99 is obtained. This value (0.99) is also used in calculating the numeric evaluation index for document DC1.

These ratios and the numeric evaluation index are calculated by the numeric evaluator 21.

The term evaluator 20 calculates the non-numeric evaluation index for document DC1 by using formula (1). When the index searcher 19 selects the input non-numeric character string 'four-wheel-drive vehicle' from the input non-numeric character strings 'four-wheel-drive vehicle' and 'sunroof' entered by the user U1 and searches table TB1 using the input non-numeric character string 'four-wheel-drive vehicle' as the search key, rows L2 and L3 are obtained. When the goodness of fit of document DC1 is evaluated, row L3 is omitted because it includes the wrong document identifier (2). The term frequency TF (unity, in the present example) of the other row L2 is substituted into formula (1), and the value of 0.75=1.5×1/(1+1) is obtained. This value (0.75) is used in calculating the non-numeric evaluation index for document DC1.

When the index searcher 19 searches table TB1 by using the input non-numeric character string 'sunroof' as the search key, row L14 is obtained. Since row L14 includes the document identifier (2) of document DC2, row L14 is omitted, so the input non-numeric character string 'sunroof' does not increase the goodness of fit between the non-numeric search condition and document DC1.

If the document evaluator 22 adds all the values contributing to the numeric and non-numeric evaluation indexes and uses the sum as the final goodness of fit for document DC1, the calculated final goodness of fit for document DC1 is 2.74 (=1+0.99+0.75).

The numeric evaluator 21, term evaluator 20, and document evaluator 22 also process document DC2 in the manner described above.

As can be seen from FIGS. 2B and 3, the non-numeric character strings 'four-wheel-drive vehicle' and 'sunroof' appear once each in document DC2, so the non-numeric evaluation index is calculated as 0.75+0.75=1.5 by using formula (1). Since the input numeric character string '2 million yen' appears in document DC2, the calculated numeric evaluation index is 2000000/2000000=1. Accordingly, the final goodness of fit for document DC2 is 2.5=(1.5+1).

The document evaluator 22 compares the final goodness of fit (2.74) for document DC1 with the final goodness of fit (2.5) for document DC2, finds that the final goodness of fit for document DC1 is greater than the final goodness of fit for document DC2, and concludes that document DC1 fits the search conditions entered by the user U1 better than document DC2. The document evaluator 22 can present the document identifiers (1) and (2) of documents DC1 and DC2 for display from the output unit 23 in order of their goodness of fit, with the document identifier (1) of document DC1 listed above the document identifier (2) of document DC2.

In the first embodiment the quality of the retrieval result is high even when numeric values appearing as character strings in the documents are specified as retrieval conditions, rather than numeric values appearing in document management information. For example, documents quoting prices in a specified range can be found with the same accuracy with which documents added within a specified range of dates are found. The first embodiment also provides greater flexibility and convenience than the prior art.

Evaluating the goodness of fit to a numeric search condition on the basis of how closely the numeric value of the search condition is matched is more appropriate than counting the number of times the numeric value appears in the document. Furthermore, when the overall goodness of fit to a plurality of search conditions is evaluated, numeric search conditions and non-numeric search conditions can be given equal weight. Accordingly, even if the user does not understand exactly how the retrieval system works, the retrieval result will usually not differ greatly from what the user expects. The system is thus convenient to use, because the user can obtain desired results without having to learn the intricate details of the retrieval process.

Second Embodiment

Figure 4:
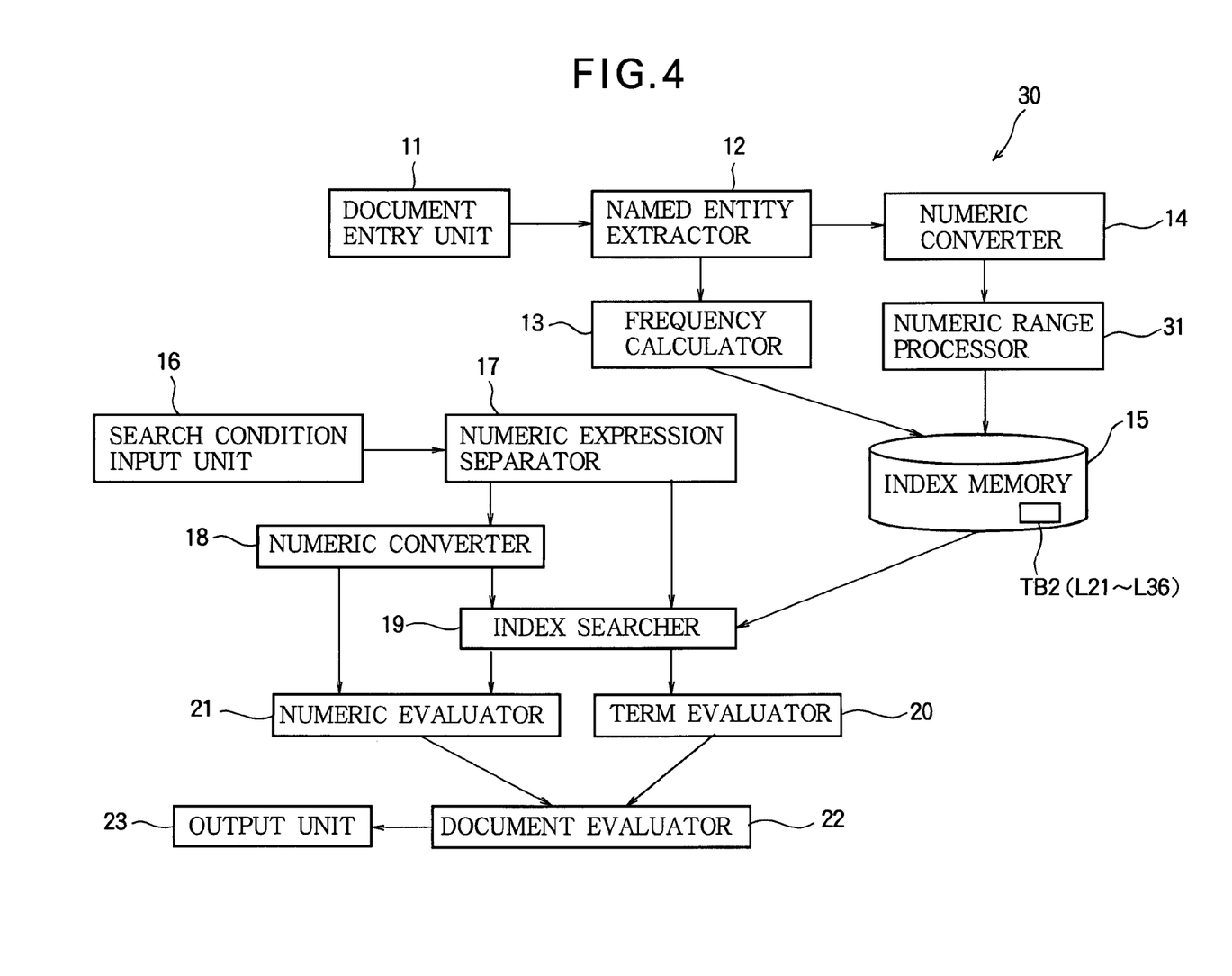
FIG. 4 is a block diagram of a document retrieval apparatus according to a second embodiment.

Referring to FIG. 4, the second embodiment is a document retrieval apparatus 30 that differs from the document retrieval apparatus 10 in the first embodiment in FIG. 1 by including a different index memory 15 and an additional numeric range processor 31. Only the differences between the first and second embodiments will be described below.

Figure 5:
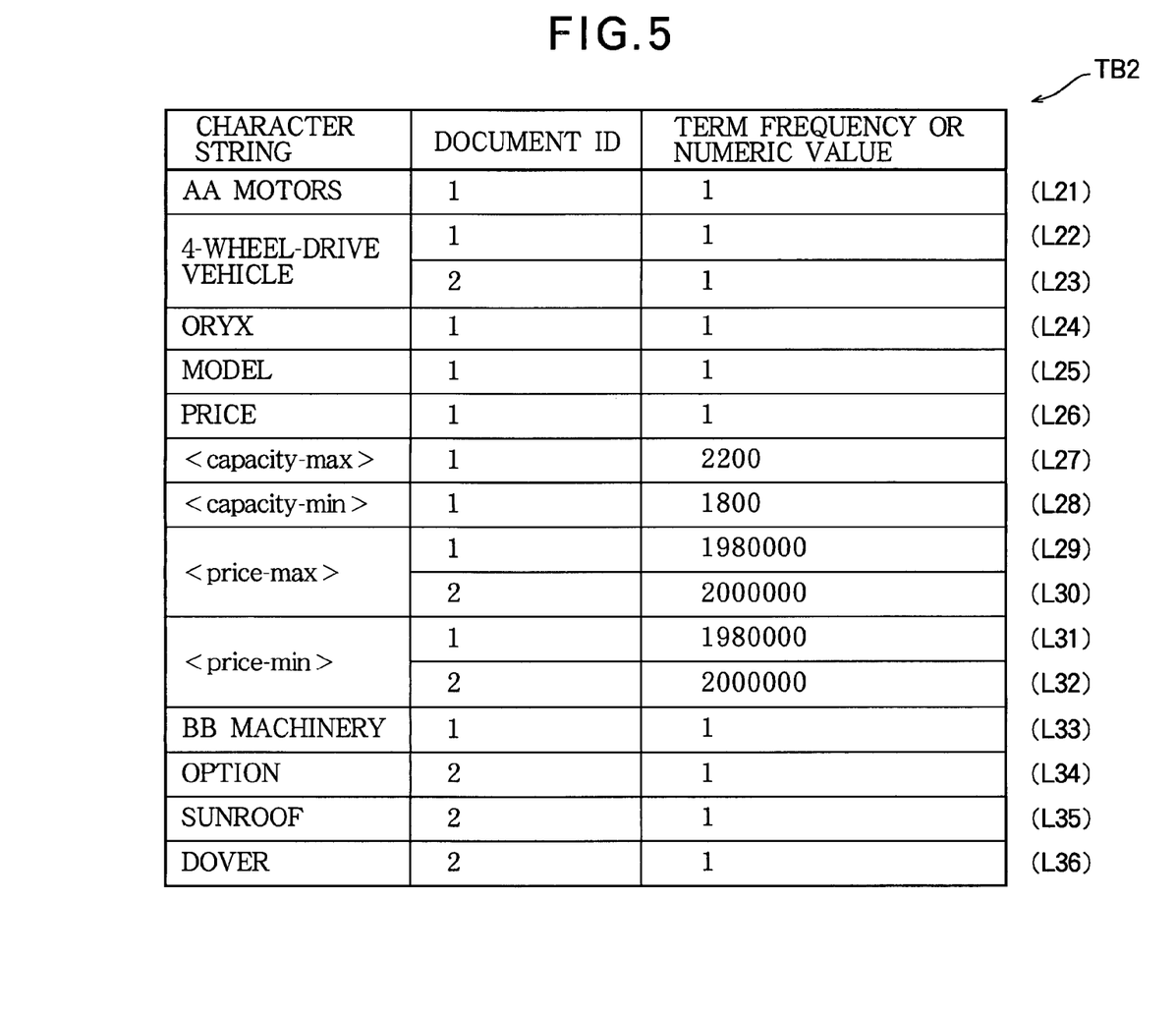
FIG. 5 shows an index table constructed from the exemplary documents in the second embodiment.

The index memory 15 in the second embodiment stores index information in the form of table TB2 shown in FIG. 5. Table TB2, consisting of rows L21-L36, differs from table TB1 (FIG. 3) in that the numeric values of numeric named character strings included in a document (document DC1, for example) are listed in the form of numeric ranges.

To list the numeric values of numeric named character strings included in a document by their numeric range, the numeric range processor 31 in the second embodiment generates numeric type character strings that are not used in the first embodiment. Among the numeric values representing the same type of information and having the same numeric type character string in the first embodiment, the numeric range processor 31 generates a maximum numeric type character string including a character string indicating a maximum value ('max', in the present example) and assigns it to the maximum numeric value of this type in the document; the numeric range processor 31 also generates a minimum numeric type character string including a character string indicating a minimum value ('min', in the present example) and assigns it to the minimum numeric value of this type in the document.

Accordingly, there are two versions of, for example, the numeric type character string 'capacity': a maximum numeric type character string 'capacity-max' indicating the maximum capacity appearing in the document, and a minimum numeric type character string 'capacity-min' indicating the minimum capacity appearing in the document. In the description of the second embodiment that follows, only these two values are stored in the index memory 15. If useful for the evaluations made in the numeric evaluator 21, however, other numeric type character strings indicating, for example, a median value, an average value, an only value, and so on may also be used.

In the example in FIG. 5, since only numeric type character strings indicating the maximum value and minimum value are used, the numeric value '1980000' included in the sole numeric named character string ('1,980,000 yen') classified under the numeric type character string 'price' in document DC1 is listed in two rows (L29 and L31).

There are various possible methods of evaluating the goodness of fit between a document and the input search conditions by using numeric ranges found by searching table TB2; the following is one method that may be used.

When a user U1 enters an input numeric named character string including a numeric value of the numeric type 'capacity' as a search condition, if the input capacity value is within the numeric range (of 2200 cc to 1800 cc, in the present example) obtained from the numeric values of the maximum and minimum numeric type character strings 'capacity-max' and 'capacity-min' in rows L27 and L28 in table TB2, the numeric evaluation index calculated by the numeric evaluator 21 is unity; this value (1) corresponds to the value (1) of the ratio between a numeric value in table TB1 and a matching value of an input numeric character string in the first embodiment. If the input capacity value is outside the numeric range, the numeric evaluation index is zero.

Alternatively, if the input capacity value is outside the numeric range, the numeric evaluator 21 may determine whether this is because the input capacity value is greater than the maximum value in the numeric range or less than the minimum value, and evaluate accordingly. If the input capacity value is greater than the maximum value in the numeric range, the numeric evaluator 21 finds the ratio between the input capacity value and the maximum value, and uses this ratio in calculating the numeric evaluation index; if the input capacity value is less than the minimum value in the numeric range, the numeric evaluator 21 finds the ratio between the input capacity value and the minimum value, and uses this ratio in calculating the numeric evaluation index.

Even if the input capacity value is within the numeric range, the numeric evaluation index may differ depending on whether the input capacity value is near the median value in the range, or near the minimum or maximum value in the range: the closer the input capacity value is to the median value in the range, the higher its numeric evaluation index (goodness of fit) becomes; the closer the input capacity value is to the minimum or maximum value and the farther it is from the median value, the lower the numeric evaluation index becomes.

The numeric evaluator 21 also processes numeric values of numeric types other than the numeric type 'capacity' (such as the numeric type 'price', for example) in the manner described above.

The second embodiment provides effects substantially equivalent to the effects obtained in the first embodiment.

In addition, in the second embodiment, when only maximum and minimum numeric type character strings are used, for one numeric type (the numeric type 'capacity', for example) in one document (document DC1, for example), there are never more than two numeric type character stings (the maximum and minimum numeric type character strings 'capacity-max' and 'capacity-min', for example) designating the same type of numeric value. Accordingly, only two rows in table TB2 are required, no matter how many numeric values of this type the document may contain; increases in table size are thereby avoided, and memory usage is reduced.

For example, although the numeric type character string 'capacity' is listed in three rows (L7-L9) associated with document DC1 in table TB1 in FIG. 3, the second embodiment uses only two rows, listing the maximum and minimum numeric type character stings 'capacity-max' and 'capacity-min', for the same document DC1.

This feature can be exploited by modifying the second embodiment to allow a user (U1) to specify a document identifier to obtain information about words (numeric named character strings, for example) appearing in the specified document. The reduced size of the table (TB2) in the second embodiment will speed up the retrieval of the desired information.

OTHER EMBODIMENTS

Although the set of documents in the first and second embodiments described above includes two documents DC1 and DC2, the set of documents may include only one document, or three or more documents. In most cases the set of documents will include many more than three documents.

Although single words (input numeric and non-numeric character strings) are entered as search conditions in the first and second embodiments, compound words and phrases may also be entered as search conditions.

The document contents are not limited to the type of contents shown in FIGS. 2A and 2B. The organization and contents of the index memory are not similarly limited to the organization and contents shown in FIGS. 3 and 5.

For example, the term frequency TF used as index information in the embodiments described above may be supplemented by another type of index information (document frequency DF, for example), or may be replaced with another type of index information.

The index information may also be organized in a tree structure. In particular, when there are a large number of numeric named character strings in a document, so that the table of numeric index information (table TB1, for example) includes a large number of rows, searching for the closest numeric value to a numeric value included in an input numeric character string can be a computationally demanding task, but it is greatly facilitated if the index information is organized in a tree structure.

Each constituent element of the document retrieval apparatus 10 and 30 is included in the indexing part that generates index information when documents are received, or the retrieval part that uses the index information to retrieve documents when search conditions are entered. Each of these two parts is useful in itself, so the invention may be practiced in an apparatus having only the indexing function or an apparatus having only the retrieval function. The indexing part includes the document entry unit 11, the named entity extractor 12, the frequency calculator 13, the numeric converter 14, the index memory 15 and the numeric range processor 31; the retrieval part includes the index memory 15, the search condition input unit 16, the numeric expression separator 17, the numeric converter 18, the index searcher 19, the term evaluator 20, the numeric evaluator 21, the document evaluator 22, and the output unit 23.

Although it has been assumed in the above descriptions of the first and second embodiments that the user U1 is a human being, the user U1 may be an information processor or a communication device.

Most of the functions realized in hardware in the description above can also be realized in software; most of the functions realized in software can also be realized in hardware.

Those skilled in the art will recognize that further variations are possible within the scope of the invention, which is defined in the appended claims.

What is claimed is:

1. A document retrieval system for retrieving a document from a set of documents according to one or more terms received as search conditions submitted by a user, the terms that can be received including both numeric terms, which include numeric values, and non-numeric terms, which do not include numeric values, the document retrieval system comprising:
a first processor for generating at least one item of index information for each document in the set of documents, the index information generated for the documents including both numeric term index information and non-numeric term index information, the non-numeric term index information including information about frequency of occurrence of non-numeric terms in the document, the numeric term index information including information about types and numeric values of numeric terms in the document;
a memory unit for storing the index information generated by the first processor;
a second processor for examining each numeric term received as a search condition, determining its type, and generating numeric search information indicating the type and numeric value of the numeric term;
a third processor for using the non-numeric term index information generated by the first processor to calculate, for each document in the set of documents including a non-numeric term received as a search condition, a first numeric quantity having a single numeric value indicating a goodness of fit between the non-numeric term and the document;
a fourth processor for using the numeric term index information generated by the first processor and the numeric search information generated by the second processor from a numeric term received as a search condition to calculate, for each document in the set of documents including a numeric term of the same type as the numeric term received as the search condition, by comparing numeric values of the numeric terms, a second numeric quantity having a single numeric value indicating a goodness of fit between the numeric term received as the search condition and the document, closer numeric values indicating better fits;
a fifth processor for calculating, for a document in the set of documents, a third numeric quantity indicating a goodness of fit between the document and the one or more terms received as search conditions, the third numeric quantity being calculated from the first and second numeric quantities; and
an output unit for sending information for displaying a list of documents from the set of documents to the user according to the third numeric quantity.

2. The document retrieval system of claim 1, wherein the type of a numeric term indicates the type of quantity represented by the numeric value of the numeric term.

3. The document retrieval system of claim 1, further comprising wherein the index information is stored in a table in which frequencies of non-numeric terms and numeric values of numeric terms are both stored together in a single column.

4. The document retrieval system of claim 1, wherein the third numeric quantity is a sum of the first and second numeric quantities obtained for the document from the one or more terms received as search conditions.

5. The document retrieval system of claim 1, further comprising an output unit presenting documents for which the third numeric quantity exceeds a predetermined quantity.

6. The document retrieval system of claim 1, wherein the numeric term index information generated for a document in the set of documents includes, for each type of numeric term appearing in the document, all numeric values of numeric terms of said type appearing in the document.

7. The document retrieval system of claim 1, wherein the numeric term index information generated for a document in the set of documents includes, for each type of numeric term appearing in the document, a minimum numeric value appearing in the document and a maximum numeric value appearing in the document.

8. The document retrieval system of claim 7, wherein the numeric term index information generated for a document in the set of documents also includes, for each type of numeric term appearing in the document, a median value appearing in the document.

9. The document retrieval system of claim 1, wherein the numeric information generator and the index information generator convert numeric values to a standard notation.

10. The document retrieval system of claim 1, wherein each of the first processor, the second processor, the third processor, fourth processor, and the fifth processor separately comprises a memory and a computing device, the memory storing instructions executed by the computing device.

11. The document retrieval system of claim 1, further comprising a computing device, wherein each of the first processor, the second processor, the third processor, and the fourth processor and the fifth processor separately comprises a memory storing instructions executed by the computing device.

12. The document retrieval system of claim 1, wherein the fourth processor, in deriving the second numeric quantity, calculates a ratio between numeric values of the numeric term received as the search condition and the numeric term of the same type as the numeric term received as the search condition, appearing in the document.

13. A retrieval execution apparatus for use in a system for retrieving a document from a set of documents according to one or more terms received as search conditions submitted by a user, the terms that can be received including both numeric terms, which include numeric values, and non-numeric terms, which do not include numeric values, the retrieval execution apparatus having:
- a first processor for generating at least one item of index information for each document in the set of documents, the index information generated for the documents including both numeric term index information and non-numeric term index information, the non-numeric term index information including information about frequency of occurrence of non-numeric terms in the document, the numeric term index information including information about types and numeric values of numeric terms in the document;
- a second processor for examining each numeric term received as a search condition, determining its type, and generating numeric search information indicating the type and numeric value of the numeric term;
- a third processor for using the non-numeric term index information generated by the index information generator to calculate, for each document in the set of documents including a non-numeric term received as a search condition, a first numeric quantity having a single numeric value indicating a goodness of fit between the non-numeric term and the document;
- a fourth processor for using the numeric term index information generated by the first processor and the numeric search information generated by the second processor from a numeric term received as a search condition to calculate, for each document in the set of documents including a numeric term of the same type as the numeric term received as the search condition, by comparing numeric values of the numeric terms, a second numeric quantity having a single numeric value indicating a goodness of fit between the numeric term received as the search condition and the document, closer numeric values indicating better fits;
- a fifth processor for calculating, for a document in the set of documents, a third numeric quantity indicating a goodness of fit between the document and the one or more terms received as search conditions, the third numeric quantity being calculated from the first and second numeric quantities; and
- an output unit for sending information for displaying a list of documents from the set of documents to the user according to the third numeric quantity.

14. The retrieval execution apparatus of claim 13, wherein the type of a numeric term indicates the type of quantity represented by the numeric value of the numeric term.

15. A method of retrieving a document from a set of documents according to one or more terms received as search conditions submitted by a user, the terms that can be received including both numeric terms, which include numeric values, and non-numeric terms, which do not include numeric values, the method comprising:
- generating at least one item of index information for each document in the set of documents, the index information generated for the documents including both numeric term index information and non-numeric term index information, the non-numeric term index information including information about frequency of occurrence of non-numeric terms in the document, the numeric term index information including information about types and numeric values of numeric terms appearing in the document; and
- examining each numeric term received as a search condition, determining its type, and generating numeric search information indicating the type and numeric value of the numeric term;
- using the non-numeric term index information to calculate, for each document in the set of documents including a non-numeric term received as a search condition, a first numeric quantity having a single numeric value indicating a goodness of fit between the non-numeric term and the document; and
- using the numeric term index information and the numeric search information generated from a numeric term received as a search condition to calculate, for each document in the set of documents including a numeric term of the same type as the numeric term received as the search condition, by comparing numeric values of the numeric terms, a second numeric quantity having a single numeric value indicating a goodness of fit between the numeric term received as the search condition and the document, closer numeric values indicating better fits;
- calculating, for a document in the set of documents, a third numeric quantity having a single numeric value indicating a goodness of fit between the document and the one or more terms received as search conditions, the third numeric quantity being calculated from the first and second numeric quantities; and
- sending information for displaying a list of documents from the set of documents to the user according to the third numeric quantity.

16. A machine-readable medium storing a program for retrieving a document from a set of documents according to one or more terms received as search conditions submitted by a user, the search terms that can be received including both numeric terms, which include numeric values, and non-numeric terms, which do not include numeric values, the program being executable by computing device, the program including:
- instructions for generating at least one item of index information for each document in the set of documents, the index information generated for the documents including both numeric term index information and non-numeric term index information, the non-numeric term index information including information about frequency of occurrence of non-numeric terms in the document, the numeric term index information including information about types and numeric values of numeric terms appearing in the document;
- instructions for examining each numeric term received as a search condition, determining its type, and generating numeric search information indicating the type and numeric value of the numeric term;

instructions for using the non-numeric term index information to calculate, for each document in the set of documents including a non-numeric term received as a search condition, a first numeric quantity having a single numeric value indicating a goodness of fit between the non-numeric term and the document; and instructions for using the numeric term index information and the numeric search information generated from a numeric term received as a search condition to calculate, for each document in the set of documents including a numeric term of the same type as the numeric term received as the search condition, by comparing numeric values of the numeric terms, a second numeric quantity having a single numeric value indicating a goodness of fit between the numeric term received as the search condition and the document, closer numeric values indicating better fits;

instructions for calculating, for a document in the set of documents, a third numeric quantity having a single numeric value indicating a goodness of fit between the document and the one or more terms received as search conditions, the third numeric quantity being calculated from the first and second numeric quantities; and instructions for sending information for displaying a list of documents from the set of documents to the user according to the third numeric quantity.

* * * * *